(12) United States Patent
Shibata

(10) Patent No.: US 11,114,727 B2
(45) Date of Patent: Sep. 7, 2021

(54) POWER STORAGE DEVICE

(71) Applicant: Murata Manufacturing Co., Ltd., Nagaokakyo (JP)

(72) Inventor: Hidetaka Shibata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 147 days.

(21) Appl. No.: 16/120,568

(22) Filed: Sep. 4, 2018

(65) Prior Publication Data

US 2018/0375066 A1    Dec. 27, 2018

Related U.S. Application Data

(63) Continuation of application No. PCT/JP2016/058039, filed on Mar. 14, 2016.

(51) Int. Cl.
*H01M 50/46* (2021.01)
*H01M 10/04* (2006.01)
(Continued)

(52) U.S. Cl.
CPC .......... *H01M 50/46* (2021.01); *H01G 11/22* (2013.01); *H01G 11/38* (2013.01); *H01G 11/52* (2013.01); *H01G 11/78* (2013.01); *H01G 11/82* (2013.01); *H01M 4/622* (2013.01); *H01M 10/04* (2013.01); *H01M 10/049* (2013.01); *H01M 10/0486* (2013.01); *H01M 50/103* (2021.01); *H01M 50/119* (2021.01); *H01M 50/434* (2021.01); *H01M 50/449* (2021.01); *H01G 11/58* (2013.01); *H01M 2220/30* (2013.01)

(58) Field of Classification Search
CPC ........ H01M 2/02; H01M 2/0207; H01M 2/16; H01M 2/1673; H01M 2/1646; H01M 4/62; H01M 4/622; H01M 10/04; H01M 50/46; H01M 50/119; H01M 50/434; H01M 50/449; H01M 50/103; H01G 11/78; H01G 11/52; H01G 11/22; H01G 11/58

See application file for complete search history.

(56) References Cited

U.S. PATENT DOCUMENTS 6,503,657 B1    1/2003  Takami
2005/0221173 A1*  10/2005  Tatebayashi .......... H01M 4/661
                                                            429/161

(Continued)

FOREIGN PATENT DOCUMENTS

CN    103035921 A    4/2013
JP    2000235868 A    8/2000
(Continued)

OTHER PUBLICATIONS

Written Opinion of the International Searching Authority issued in PCT/JP2016/058039, dated Jun. 14, 2016.
(Continued)

*Primary Examiner* — Karie O'Neill Apicella
(74) *Attorney, Agent, or Firm* — Arent Fox LLP

(57) ABSTRACT

A power storage device includes a case, an electrode body, and an electrolyte. The electrode body is located in the case and has a positive electrode, a negative electrode, and a separator located between the positive and negative electrodes. The electrolyte fills the case 2. A principal surface of the electrode body is connected to an inner surface of the case.

18 Claims, 3 Drawing Sheets

(51) Int. Cl.
*H01M 50/449* (2021.01)
*H01M 50/103* (2021.01)
*H01M 50/434* (2021.01)
*H01M 50/119* (2021.01)
*H01G 11/52* (2013.01)
*H01G 11/78* (2013.01)
*H01M 4/62* (2006.01)
*H01G 11/58* (2013.01)
*H01G 11/82* (2013.01)
*H01G 11/38* (2013.01)
*H01G 11/22* (2013.01)

(56) References Cited

U.S. PATENT DOCUMENTS

2013/0084499 A1  4/2013  Yanagita et al.
2015/0221925 A1* 8/2015  Kim .................. H01M 10/0525
                                                  429/61

FOREIGN PATENT DOCUMENTS

| JP | 2000285965 A | 10/2000 |
| JP | 2002305032 A | 10/2002 |
| JP | 2015146252 A |  8/2015 |

OTHER PUBLICATIONS

International Search Report issued in PCT/JP2016/058039, dated Jun. 14, 2016.

* cited by examiner

POWER STORAGE DEVICE

CROSS REFERENCE TO RELATED APPLICATIONS

The present application is a continuation of International application No. PCT/JP2016/058039, filed Mar. 14, 2016, the entire contents of each of which are incorporated herein by reference.

TECHNICAL FIELD

The present invention relates to a power storage device.

BACKGROUND ART

Conventionally, power storage devices are used as a power source in various kinds of electronic equipment. For example, Japanese Patent Application Laid-Open No. 2015-146252 (Patent Document 1) discloses a power storage device in which an electrode assembly (electrode body) is housed in a case. In the power storage device disclosed therein, a spacer for adjusting a gap between the electrode assembly and an inner surface of the case is provided in the case. Specifically, a spacer is provided on both sides of the electrode assembly in the case. That is, a plurality of spacers are provided in the case.

In recent years, electronic equipment has been made thinner and thus the need for thinner power storage devices has increased. A main object of the present invention is to provide a power storage device which is thin.

BRIEF DESCRIPTION OF THE INVENTION

The power storage device according to the present invention includes a case, an electrode body, and an electrolyte. The electrode body is placed in the case. The electrode body has a positive electrode, a negative electrode, and a separator placed between the positive electrode and the negative electrode. The electrode body is integrated. The electrolyte is filled in the case. A principal surface of the electrode body is connected to an inner surface of the case.

In the power storage device according to the present invention, the principal surface of the electrode body is connected to the inner surface of the case. For this reason, a spacer for adjusting a gap between the inner surface of the case and the electrode body is not necessarily provided. Accordingly, a power storage device can be provided which is thin.

In the power storage device according to the present invention, it is preferable that the electrode body and the inner surface of the case be bonded with a bonding layer.

In the power storage device according to the present invention, it is preferable that the positive electrode and the negative electrode contain a binder, and the bonding layer contain the same kind of resin as the binder contained in the positive electrode or the negative electrode.

In the power storage device according to the present invention, it is preferable that an electrode located on the electrode body on an innermost surface side of the case be a negative electrode, and the binder contained in the negative electrode and the bonding layer both contain SBR.

In the power storage device according to the present invention, it is preferable that the electrode body have a tape which integrates the positive electrode, the separator, and the negative electrode so that a recessed portion is formed in the central portion of the principal surface of the electrode body in the width direction, and the bonding layer is located in the recessed portion in plan view.

In the power storage device according to the present invention, it is preferable that the bonding layer do not have corners in plan view.

In the power storage device according to the present invention, it is preferable that the case be constituted by an electrical conductor.

According to the present invention, a thin power storage device can be provided.

DETAILED DESCRIPTION OF THE PREFERRED EMBODIMENTS

Figure 1:
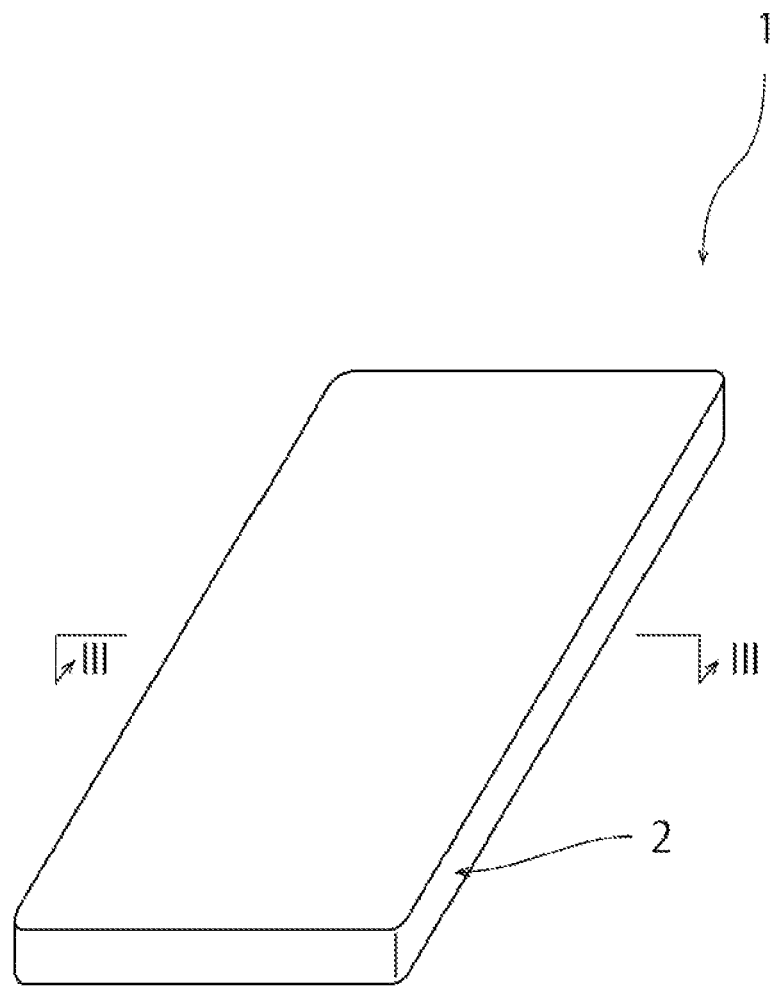
FIG. 1 is a schematic perspective view of a power storage device according to a first exemplary embodiment.

Examples of preferred embodiments in the practice of the present invention will be described below. However, the following embodiments are provided merely by way of example and the invention is not limited to the following embodiments in any way.

Furthermore, members that have a substantially identical function shall be denoted by an identical reference symbol in the respective drawings referenced in the embodiment and the like. In addition, the drawings referenced in the embodiment and the like are shown schematically. The dimensional ratios and the like of the objects drawn in the drawings may different from the dimensional ratios and the like of real objects. The dimensional ratios and the like of the objects may be also different between the drawings. The dimensional ratios and the like of specific objects should be determined in view of the following description.

First Embodiment

Figure 2:
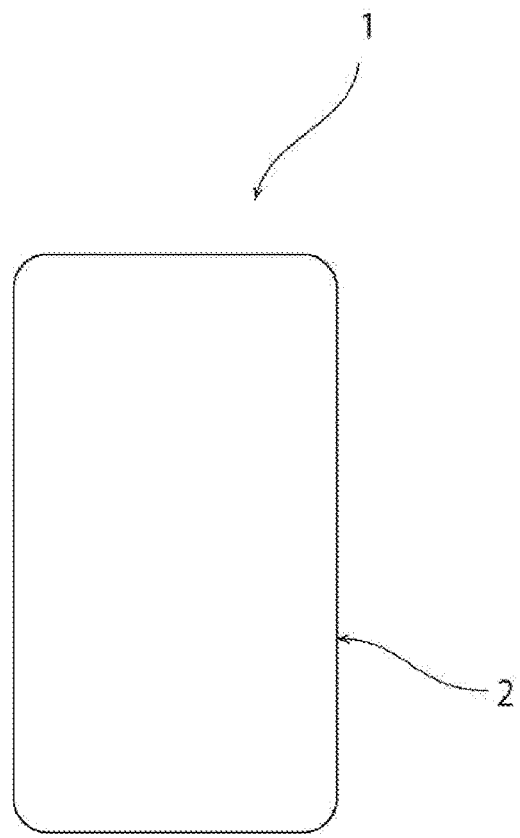
FIG. 2 is a schematic plan view of the power storage device according to the first embodiment.
Figure 3:
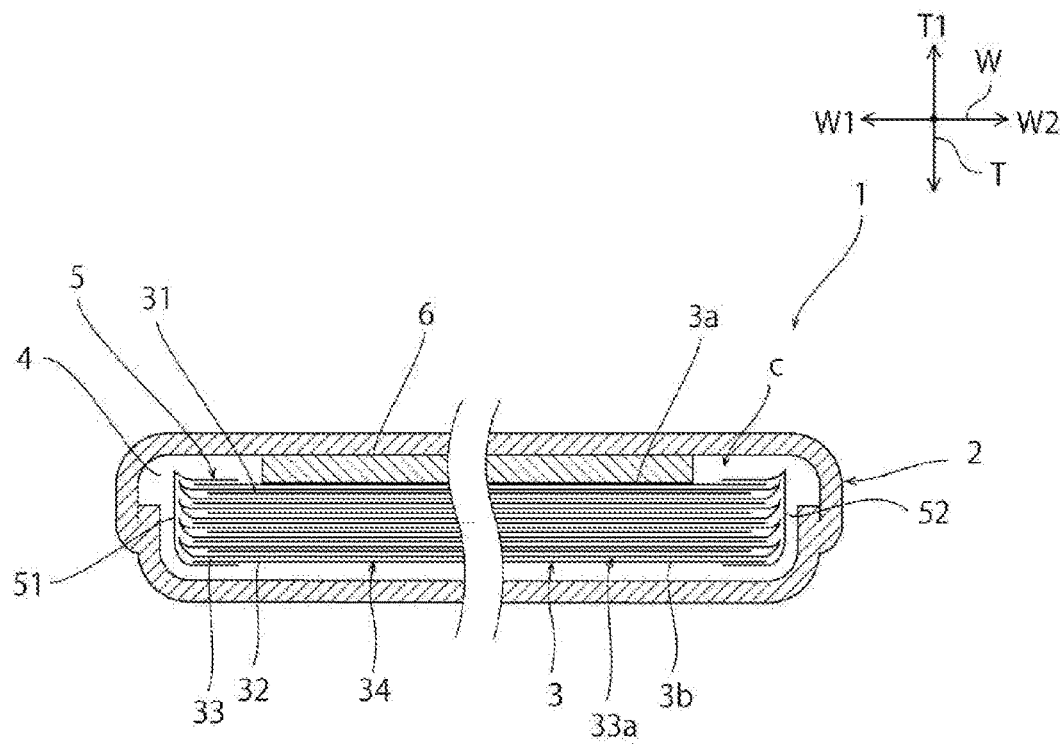
FIG. 3 is a schematic cross-sectional view taken along line III-III of FIG. 1.

A power storage device 1 shown in FIGS. 1 to 3 includes an electrolyte 4 such as an electrolytic solution or a gel electrolyte. The power storage device 1 may be, for example, a battery such as a secondary battery, a capacitor such as an electrical double layer capacitor, or the like.

As shown in FIG. 3, the power storage device 1 includes a case having a substantially rectangular parallelepiped shape. The corners of the case 2 are preferably rounded in plan view. The case 2 is preferably formed of a material which reacts minimally with the electrolyte 4. The case 2 may, by way of example, be formed of an insulator or an electrical conductor such as a metal. The case 2 may be formed of an electrical conductor with its inner surface being coated with an insulating coating film.

Though not shown in FIG. 1, one or more electrode terminals may be provided in the case 2. A positive terminal and a negative terminal may be both provided in the case 2, or one of the terminals may be provided and the other terminal may be constituted by the case 2 that is formed of an electrical conductor.

As shown in FIG. 3, an electrode body 3 is located inside the case 2. The electrode body 3 has a plurality of positive electrodes 31 and a plurality of negative electrodes 32 (each having a rectangular shape), and a respective separator 33 located between adjacent pairs of positive and negative electrodes. Respective pairs of positive and negative electrodes 31 and 32 oppose each other in a laminating direction T with a respective separator 33 interposed there between. Each separator 33 insulates its associated pair of positive and negative electrodes 31 and 32. In the preferred embodiment, adjacent outer edges (end sides) of the separators 33 are connected to each other with the a respective positive electrode 31 interposed there between. Respective adjacent pairs of separators 33 cooperate to form a bag-shaped separator 33a which houses a respective positive electrode 31. While it is preferred that the two separators 33 forming the bag shaped separator 33a are connected to one another, this is not required. A sheet-like form or a zigzag-folded form separator may be provided between the positive and negative electrodes.

The structure of the positive electrodes 31 can be appropriately determined depending on the kind of the power storage device 1. For example, when the power storage device 1 is a secondary battery, the positive electrodes 31 can be constituted by a positive collector and an active material layer provided on at least one surface of the positive collector. For example, when the power storage device 1 is an electrical double layer capacitor, the positive electrodes 31 can be constituted by a positive collector and a polarizable electrode layer provided on at least one surface of the positive collector. The positive electrodes 31 usually contains a binder. Specifically, a positive electrodes active material layer, a polarizable electrode layer, or the like of the positive electrode 31 contains a binder.

The structure of the negative electrodes 32 can also be appropriately determined depending on the kind of the power storage device 1. For example, when the power storage device 1 is a secondary battery, the negative electrodes 32 can be constituted by a negative collector and an active material layer provided on at least one surface of the negative collector. For example, when the power storage device 1 is an electrical double layer capacitor, the negative electrodes 32 can be constituted by a negative collector and a polarizable electrode layer provided on at least one surface of the negative collector. The negative electrodes 32 usually contain a binder. Specifically, a negative electrode active material layer, a polarizable electrode layer, or the like of the negative electrodes 32 contains a binder.

The separator 33 can be constituted by, for example, a porous sheet having open cells which allow ions in an electrolyte to move through the porous sheet. The separator 33 may also be constituted by, for example, polypropylene, polyethylene, polyimide, cellulose, aramid, polyvinylidene fluoride, Teflon (registered trademark) or the like. Further, a surface of the separators 33 may be covered with a ceramic coating layer, a bonding layer, or the like. The surface of the separators 33 may have bonding properties. The separators 33 may be a single layer film made of one material or may be a composite film or a multiple layer film made of one kind or two or more kinds of materials.

In the power storage device 1, the positive electrodes 31, the separators 33, and the negative electrodes 32 are laminated in this order a plurality of times. A laminate 34 including the positive electrodes 31, the separators 33, and the negative electrodes 32 is integrated together. The electrode body 3 includes a pair of tapes 51 and 52 tape 5 which integrate the laminate 34 to constitute the electrode body 3 integrating therewith. The base material of the tapes may be polypropylene, polyethylene terephthalate, polyimide, or the like. In the case of an adhesive tape, an adhesive agent may be composed of an acrylic, silicone, or rubber-based composition having electrolyte resistance. The tape preferably has thickness which is equal to or smaller than the thickness of the bonding layer.

The electrolyte 4 fills (or at least partially fills) the case 2 and preferably impregnates the electrode body 3.

In the power storage device 1, a principal surface of the electrode body 3 (i.e., the upper surface as viewed in FIG. 3) is connected to an inner surface of the case 2. Specifically, a principal surface 3a of the electrode body 3 is bonded to the inner surface of the case 2 by a bonding layer 6. In FIG. 3, the electrode body 3 is connected to the case 2 on the upper side (T1 side) of the figure but may be connected thereto on the lower side of the figure.

While the use of such a bonding layer is preferred, it is not necessary. For example, the electrode body 3 and the case 2 may be directly connected to each other. By way of example, an outermost layer of the laminate may be a bondable separator or a negative electrode mixture layer having bonding properties.

It is preferable that the bonding layer 6, although not particularly limited, reacts minimally with the electrolyte 4. To this end, the bonding layer 6 is preferably formed of a resin or a resin composition including a resin. More specifically, the bonding layer 6 includes at least one kind of resin selected from the group consisting of acrylic resin such as polyacrylonitrile (PAN) and polyacrylic acid (PAA); synthetic rubber such as styrene butadiene rubber (SBR), isoprene rubber, and ethylene propylene rubber (EPDM); natural rubber; cellulose; carboxymethyl cellulose (CMC); polyvinyl chloride (PVC); polyimide (PI); polyamide (PA); polyethylene (PE); polypropylene (PP); polyethylene terephthalate (PET); polyether nitrile (PEN); fluorocarbon resin such as polyvinylidene fluoride (PVDF), polytetrafluoroethylene (PTFE), hexafluoropropylene, perfluoroalkyl vinyl ether (PFA), and polyvinyl fluoride (PVF); fluororubber; silicone resin; and epoxy resin, or a resin composition thereof (a mixture, a copolymer, or the like of two or more kinds thereof).

The resin contained in the bonding layer 6 is preferably the same kind of resin as the binder resin contained in the positive and/or negative electrodes 31, 32. Further, it is preferably the same kind of resin as the binder resin contained in the electrode (positive electrode 31 or negative electrode 32) where the bonding layer 6 is bonded. In the present embodiment, an electrode located on the electrode body 3 on the innermost surface side (T1 side) of the case 2 is the negative electrode 32 and the negative electrode 32 is bonded with the bonding layer 6. Therefore, it is preferable that the binders contained in the negative electrode 32 and the bonding layer 6 both contain SBR. A thickening material composed of carboxymethyl cellulose (CMC) or the like may be contained in the bonding layer in order to adjust slurry viscosity during formation of the bonding layer.

In the electrode such as the positive electrode 31 and the negative electrode 32, an active material layer may be provided on one side of the collector or on both sides of the collector. From the viewpoint of making the power storage device 1 thinner, a negative electrode active material layer is preferably provided on one side of the negative collector.

As described above, the principal surface 3a of the electrode body 3 thus integrated and the inner surface of the case 2 are bonded to each other. For this reason, as in the power storage device disclosed in Patent Document 1, it is not necessary to provide a plurality of spacers to adjust a gap between the inner surface of the case and the electrode body. Accordingly, a thinner power storage device can be provided.

The tapes 51 and 53 integrate the positive electrodes 31, the separators 33 and the negative electrodes 32 so as to form a recessed portion c in the central portion of the principal surface of the electrode body 3 in the width direction W. The bonding layer 6 is located in the recessed portion c in plan view. Therefore, the power storage device 1 can be made even thinner.

The first tape 51 is provided on the W1 side of the laminate 34 and extends from the first principal surface 3a across one side surface (W1, or left side as viewed in FIG. 3) of the laminate 34 and to the second principal surface 3b of the laminate 34. The first tape 51 contacts respective ends (the left ends as viewed in FIG. 3) of the separators 33 on the W1 side and bends them toward the T1 side (upper side as viewed in FIG. 2) in the laminating direction T.

The second tape 52 extends from the first principal surface 3a of the laminate 34 across the W2 side (the right side of the laminate 34 as viewed in FIG. 3) and onto the second principal surface 3b of the laminate. The second tape 52 contacts respective ends (the right ends as viewed in FIG. 3) of the separators 33 and bends them (upwardly as viewed in FIG. 3) toward the T1 side in the laminating direction T.

As described above, both lateral ends of the separators 33 are fixed in a state of being bent toward the T1 side and the size of the power storage device 1 can be reduced.

For example, as in the power storage device disclosed in Patent Document 1, when spacers are laminated on the electrode body, it is difficult to suppress displacement in a plane direction of the electrode body. When the electrode body is displaced in the plane direction and then comes in contact with the case having electrical conductivity, a short circuit may occur. In contrast, in the power storage device 1 according to the present invention, the electrode body 3 is fixed to the case 2 with the bonding layer 6 and the electrode body 3 is restricted from being displaced relative to the case 2 in both the laminating and plane (i.e., horizontal direction as viewed in FIG. 3) directions. Therefore, a short circuit defect is less likely to occur.

When the case 2 and the electrode body 3 are bonded by the bonding layer 6, there are concerns that the bonding layer 6 can dissolve in or react with the electrolyte. For this reason, the bonding layer 6 is preferably formed of a material which is stable to the electrolyte. Specifically, the resin contained in the bonding layer 6 is preferably less likely to dissolve in and/or react with the electrolyte, and preferably does not substantially dissolve therein and/or react therewith. Therefore, the resin contained in the bonding layer 6 is preferably the same resin as that contained in the positive and/or negative electrodes 31 and trode 32.

From the viewpoint of improving bonding strength between the bonding layer 6 and the electrode body 3, the bonding layer 6 preferably contains the same type of resin as the binder resin contained in the electrode that is bonded to the bonding layer 6. For example, SBR is preferably used as the binder in the negative electrode 32, so that when the electrode which is located on the electrode body 3 on the innermost surface side of the case 2 and is bonded to the bonding layer 6 is the negative electrode 32, both the bonding layer 6 and the negative electrode 32 preferably contain SBR.

From the viewpoint of suppressing separation between the bonding layer 6 and the electrode body 3, it is preferable that the bonding layer 6 does not have corners in plan view. This is because when stress is applied to the bonding layer having corners, the stress is concentrated on the corners, which may trigger separation. The bonding layer 6 without corners does not provide a trigger for separation, so that the bonding layer 6 is less likely to separate.

Another example of a preferred embodiment of the present invention will be described below. In the following description, members having substantially the same functions as those of the first embodiment will be referred to using the same symbols and description thereof will be omitted.

Second Embodiment

Figure 4:
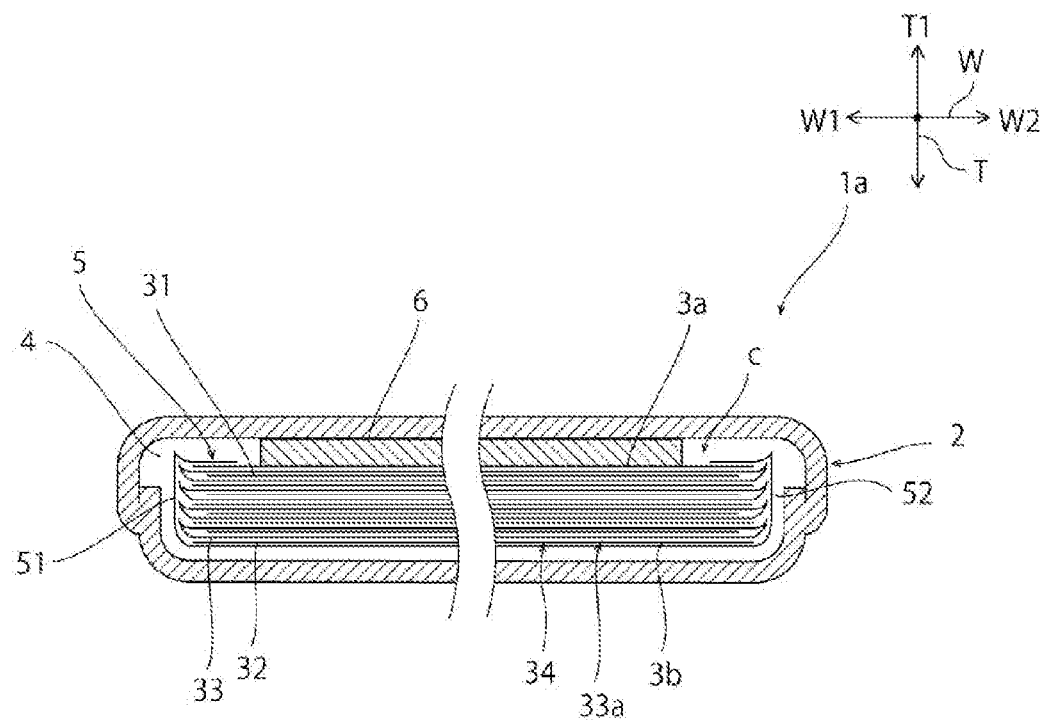
FIG. 4 is a schematic cross-sectional view of a power storage device according to a second exemplary embodiment of the invention.

FIG. 4 is a schematic cross-sectional view of a power storage device 1a according to a second exemplary embodiment.

In the first embodiment, first and second tapes 51 and 52 are provided. However, the present invention is not limited to this configuration. In the present invention, the tape may be integrally provided. For example, the first tape 51 and the second tape 52 may be connected on the second principal surface 3b of the laminate 34 to form a single tape 5. In this case, the number of parts constituting the power storage device 1 can be reduced. In addition, the tape 5 can be firmly fixed to the laminate 34.

Third Embodiment

Figure 5:
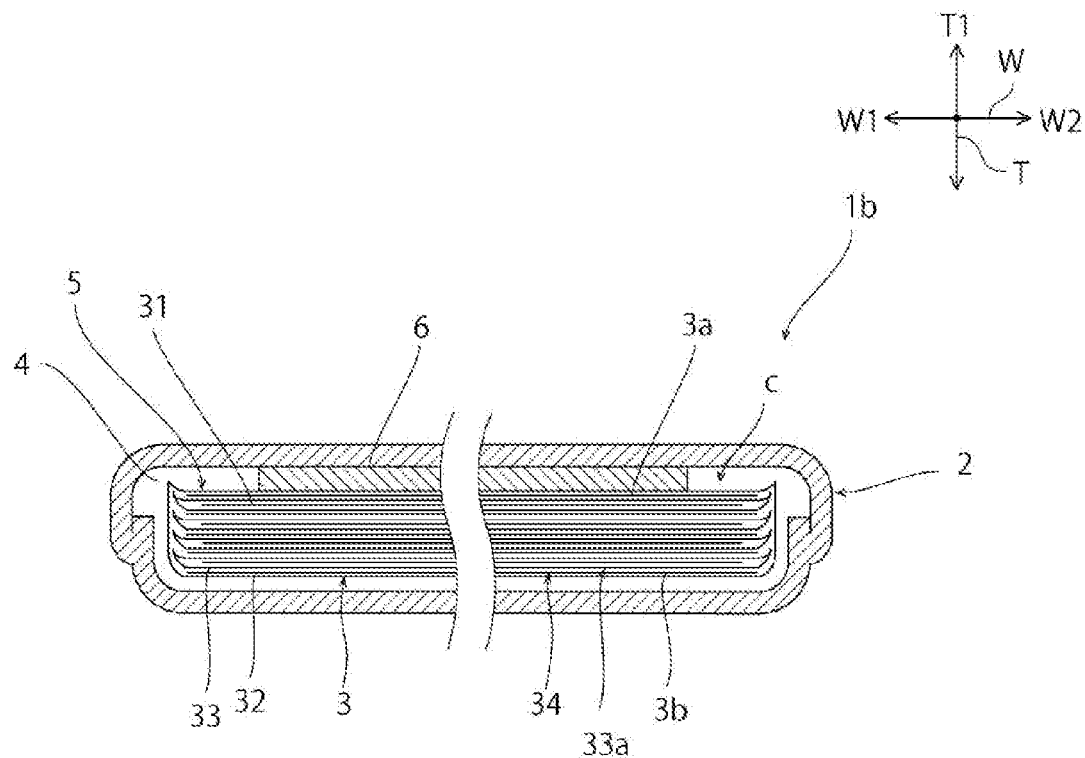
FIG. 5 is a schematic cross-sectional view of a power storage device according to a third exemplary embodiment of the invention.

FIG. 5 is a schematic cross-sectional view of a power storage device 1b according to a exemplary third embodiment.

As shown in FIG. 5, in the present invention, the tape 5 may be wound around the laminate 34.

DESCRIPTION OF REFERENCE SYMBOLS 1, 1a, 1b: Power storage device
2: Case
3: Electrode body
3a: First principal surface of electrode body
3b: Second principal surface of electrode body
4: Electrolyte
5: Tape
6: Bonding layer
31: Positive electrode
32: Negative electrode
33: Separator
33a: Bag-shaped separator
34: Laminate
51: First tape
52: Second tape
c: Recessed portion

The invention claimed is:

1. A power storage device comprising:
   a case;
   an electrode body located in the case, the electrode body having opposed first and second principal surfaces, the electrode body comprising a positive electrode, a negative electrode, and a separator located between the positive and negative electrodes;

at least one tape which extends between the first and second principal surfaces to integrate the positive electrode, the negative electrode and the separator together, edges of the at least one tape cooperating with the first principal surface of the electrode body to define a recessed portion at the first principal surface;

an electrically insulating bonding layer located in the recessed portion and bonding the electrode body to an inner surface of the case; and an electrolyte located in the case and contacting the electrode body.

2. The power storage device according to claim 1, wherein:

the positive and negative electrodes contain a resin binder; and the bonding layer contains the same resin binder as the positive and negative electrodes.

3. The power storage device according to claim 2, wherein:

a surface of the negative electrode defines at least a portion of the first principal surface of the electrode body is in contact with the bonding layer; and the resin binder contained in the negative electrode and the bonding layer contains SBR.

4. The power storage device according to claim 1, wherein the recessed portion is formed at a central portion of the first principal surface of the electrode body in a width direction of the case.

5. The power storage device according to claim 1, wherein the bonding layer does not have corners in plan view.

6. The power storage device according to claim 1, wherein the case is an electrical conductor.

7. The power storage device according to claim 1, wherein a surface of the separator is covered with a ceramic coating layer.

8. The power storage device according to claim 1, wherein the electrolyte impregnates the electrode body.

9. A power storage device comprising:

a case;

an electrode body located in the case, the electrode body comprising a plurality of positive electrode, negative electrode pairs and a separator located between each positive electrode, negative electrode pair, a principal surface of the electrode body being connected to an inner surface of the case, the positive and negative electrodes containing a resin binder the electrode body and the inner surface of the case being bonded together by a bonding layer which contains the same resin binder as the positive and negative electrodes; and an electrolyte located in the case and contacting the electrode body.

10. The power storage device according to claim 9, further comprising at least one tape which contacts a plurality of the separators.

11. The power storage device according to claim 10, wherein the at least one tape comprises a first tape that contacts respective first edges of the separators and a second tape which contacts respective second edges of the separators.

12. The power storage device according to claim 11, wherein each of the first edges are on a first lateral side of the electrode body and each of the second edges are on a second lateral side of the electrode body opposite to the first lateral side.

13. The power storage device according to claim 9, wherein:

one of the negative electrodes faces the inner surface of the case and is in contact with the bonding layer; and the binder contained in the negative electrodes and the bonding layer contains SBR.

14. The power storage device according to claim 9, wherein the bonding layer does not have corners in plan view.

15. The power storage device according to claim 9, wherein the case is an electrical conductor.

16. The power storage device according to claim 9, wherein a surface of the separators is covered with a ceramic coating layer.

17. The power storage device according to claim 1, wherein the bonding layer fixes the electrode body to the inner surface of the case in such a manner that the electrode body is not free to move laterally relative to the case.

18. The power storage device according to claim 1, wherein the electrolyte impregnates the separator.

* * * * *